US012573970B2

(12) United States Patent (10) Patent No.: US 12,573,970 B2

Huang et al. (45) Date of Patent: Mar. 10, 2026

(54) LOW-LOSS MOTOR AND A DRIVE CIRCUIT THEREOF

(71) Applicant: Intex Marketing Ltd., Tortola (VG)

(72) Inventors: Zhi Xiong Huang, Fujian (CN); Ying Biao Zhang, Fujian (CN); Zhen Wen Lin, Fujian (CN)

(73) Assignee: Intex Marketing Ltd., Tortola (VG)

( * ) Notice: Subject to any disclaimer, the term of this patent is extended or adjusted under 35 U.S.C. 154(b) by 106 days.

(21) Appl. No.: 18/559,350

(22) PCT Filed: May 11, 2022

(86) PCT No.: PCT/IB2022/054394

§ 371 (c)(1),
(2) Date: Nov. 7, 2023

(87) PCT Pub. No.: WO2022/238931

PCT Pub. Date: Nov. 17, 2022

(65) Prior Publication Data

US 2024/0235442 A1      Jul. 11, 2024

(30) Foreign Application Priority Data

May 11, 2021    (CN) .......................... 202121001527.8

(51) Int. Cl.
*H02P 7/29*       (2016.01)
*F04D 25/06*      (2006.01)
*F04D 27/00*      (2006.01)

(52) U.S. Cl.
CPC ................ *H02P 7/29* (2013.01); *F04D 25/06* (2013.01); *F04D 27/004* (2013.01)

(58) Field of Classification Search
CPC ........... H02P 7/29; F04D 25/06; F04D 27/004
See application file for complete search history.

(56) References Cited

U.S. PATENT DOCUMENTS

| | | | |
|---|---|---|---|
| 2012/0012344 A1* | 1/2012 | McLoughlin .......... | A62C 27/00 169/13 |
| 2014/0097777 A1* | 4/2014 | Leong ...................... | H02P 7/06 318/461 |

FOREIGN PATENT DOCUMENTS

| | | |
|---|---|---|
| CN | 105207531 | 12/2015 |
| CN | 207261197 | 4/2018 |
| CN | 207830161 | 9/2018 |
| CN | 211266641 | 8/2020 |
| DE | 4210302 | 9/1993 |

(Continued)

OTHER PUBLICATIONS

Invitation to Pay Additional Fees and, Where Applicable, Protest Fee, issued by the International Searching Authority, dated Sep. 19, 2022, for International Patent Application No. PCT/IB2022/054394; 10 pages.

(Continued)

*Primary Examiner* — Zoheb S Imtiaz

(74) *Attorney, Agent, or Firm* — Faegre Drinker Biddle & Reath LLP

(57)       ABSTRACT

A low-loss motor may include a casing, a rear cover, and a rotatable shaft. The rotatable shaft may have a first end contacting the rear cover and a second end. An end face of the first end of the rotatable shaft may have a first shape and a contact surface of the rear cover may have a second shape, the second shape being different than the first shape.

18 Claims, 10 Drawing Sheets

(56)          References Cited

FOREIGN PATENT DOCUMENTS

| JP | S56169759 | 12/1981 |
| JP | S59122757 | 7/1984 |
| JP | S63220738 | 9/1988 |
| JP | 3220033 | 2/2019 |

OTHER PUBLICATIONS

International Search Report and Written Opinion as issued by the International Searching Authority, dated Jan. 12, 2023, for International Patent Application No. PCT/IB2022/054394; 17 pages.

Second Written Opinion as issued by the International Preliminary Examining Authority, dated Apr. 21, 2023, for International Patent Application No. PCT/IB2022/054394; 6 pages.

International Preliminary Report on Patentability as issued by the International Preliminary Examining Authority, dated Aug. 31, 2023, for International Patent Application No. PCT/IB2022/054394; 20 pages.

Office Action issued by the European Patent Office, dated May 9, 2025, for European Patent Application No. 22726179.9; 4 pages.

Translation of CN207830161U, published Sep. 7, 2018; 5 pages.

\* cited by examiner

150

LOW-LOSS MOTOR AND A DRIVE CIRCUIT THEREOF

RELATED APPLICATIONS

The present application is a national stage entry of International (PCT) Patent Application Number PCT/IB2022/054394, filed May 11, 2022, which claims priority to Chinese Application No. CN202121001527.8, filed May 11, 2021, the entire disclosures of which are expressly incorporated by reference herein.

FIELD

The present application relates to a motor, in particular to a motor driven by a USB power supply.

BACKGROUND

At present, the USB power supply on the market (charging head, power bank, car USB charging head, etc.) has a maximum power setting for safety reasons or its own power limitation. If the load is too large, the power supply will cut off the output. In motor products, due to that at the moment when the motor starts, the starting current will far exceed the normal working current of the motor, the motor whose working current meets the rated current of the USB power supply will be unable to work. The reason is that at the moment when the motor starts, the power supply will cut off the output for protection.

In addition, as shown in FIG. 1, the commonly used thrust structure of the motor shaft is that the shaft shoulder of the motor shaft is stuck on the oil-impregnated bearing, and the shaft shoulder rubs against the oil-impregnated bearing, the friction force is high, and the loss of motor power is large.

SUMMARY

In an exemplary embodiment of the present disclosure, a low-loss motor to increase the service life of the motor is provided.

In an exemplary embodiment of the present disclosure, a drive circuit of a motor is provided, which uses the effective output of the power supply with maximum efficiency.

In an exemplary embodiment of the present disclosure, a low-loss motor is provided. The low-loss motor comprising: a casing: a rear cover arranged at a rear end of the casing along an axial direction, the casing and rear cover cooperating to form an interior: and a rotating shaft having a first end and a second end opposite the first end. The first end of the rotating shaft is inserted into the casing. An end face of the first end of the rotating shaft is in direct contact with the rear cover. At least one of the end face of the rotating shaft and a contact surface of the rear cover contacting the rotating shaft is an arc surface.

In another exemplary embodiment of the present disclosure, a low-loss motor is provided. The low-loss motor comprising: a casing: a rear cover arranged at a rear end of the casing along the axial direction: and a rotating shaft having a first end and a second end opposite the first end. The first end of the rotating shaft is inserted into the casing. An end face of the first end of the rotating shaft is contacted with the rear cover by a ball.

In a further exemplary embodiment of the present disclosure, a low-loss motor is provided. The low-loss motor comprising: a casing: a rear cover arranged at a rear end of the casing along the axial direction: and a rotating shaft having a first end and a second end opposite the first end. The first end of the rotating shaft is inserted into the casing. An end face of the first end of the rotating shaft is in direct contact with the rear cover through a wear-resistant gasket and the end face of the first end of the rotating shaft is an arc surface.

In yet a further exemplary embodiment of the present disclosure, a drive circuit of the low-loss motor is provided. The drive circuit is connected to a USB power supply. The drive circuit uses a PWM signal to control the motor to perform a soft start. The drive circuit adjusts the duty cycle of the PWM signal to make the supply current of the motor in the starting zone slowly increase to the maximum supply current.

In an example thereof, a duty ratio of the PWM signal is reduced when the motor is in a blow-off zone, so as to reduce the rotational speed of the motor.

In another example thereof, a duty ratio of the PWM signal is increased when the motor is in a blowing pressure zone, so as to increase the speed of the motor.

In a further example thereof, the motor is one of a brushed motor or a brushless motor.

In a further still exemplary embodiment of the present disclosure, a low-loss motor is provided. The low-loss motor comprising: a casing: a rear cover arranged at a rear end of the casing along an axial direction: and a rotating shaft with a first end being inserted into the casing. An end face of the first end of the rotating shaft is in direct contact with a contact surface of the rear cover. The end face of the first end of the rotating shaft having a first shape and the contact surface of the rear cover having a second shape different from the first shape.

In an example thereof, one of the first shape and the second shape is an arc surface.

In another example thereof, one of the first shape and the second shape is conical.

In a further example thereof, one of the first shape and the second shape is planar.

In yet a further example thereof, the contact surface of the rear cover includes a wear-resistant material.

In still another exemplary embodiment of the present disclosure, a method of controlling an air pump is provided. The method comprising the steps of: supporting a first end of a rotating shaft of a motor of the air pump with a rear cover of the motor, an end face of the first end of the rotating shaft having a first shape and a contact surface of the rear cover having a second shape different from the first shape: supporting an impeller of the air pump with a second end of the rotating shaft; connecting a USB power supply to a drive circuit of a motor of the air pump: and controlling a current supplied by the drive circuit from the USB power supply to the motor with a PWM signal such that the current is below a first threshold during a start-up of the motor.

In embodiments, the present disclosure provides a low-loss motor, which comprises a casing, a rear cover and a rotating shaft: the rear cover is arranged at the rear end of the casing along the axial direction, one end of the rotating shaft is inserted into the casing, and the end face of the end of the rotating shaft that is inserted into the casing is in direct contact with the rear cover: and at least one of the end face of the rotating shaft and the contact surface of the rear cover and the rotating shaft is an arc surface.

In embodiments, the present disclosure further provides a low-loss motor, which comprises a casing, a rear cover and a rotating shaft: the rear cover is arranged at the rear end of the casing along the axial direction, one end of the rotating shaft is inserted into the casing, and the end face of the end of the rotating shaft that is inserted into the casing is contacted with the rear cover by a ball.

In embodiments, the present disclosure further provides a low-loss motor, which comprises a casing, a rear cover and a rotating shaft: the rear cover is arranged at the rear end of the casing along the axial direction, one end of the rotating shaft is inserted into the casing, and the end face of the end of the rotating shaft that is inserted into o the casing is in direct contact with the rear cover through a wear-resistant gasket: and the end face of the rotating shaft is an arc surface.

In embodiments, the present disclosure further provides a drive circuit for the motor above mentioned, the drive circuit is connected to a USB power supply, and uses a PWM signal to control the motor to perform soft start, and adjusts the duty cycle of the PWM signal to make the supply current of the motor in the starting zone slowly increase to the maximum supply current.

In embodiments, the duty ratio of the PWM signal is reduced when the motor is in the blow-off zone, so as to reduce the rotational speed of the motor.

In embodiments, the duty ratio of the PWM signal is increased when the motor is in the blowing pressure zone, so as to increase the speed of the motor.

In embodiments, the motor is a brushed motor or a brushless motor.

In embodiments, the present disclosure further provides a low-loss motor, which comprises the above-mentioned low-loss motor and the above-mentioned drive circuit.

Advantages of exemplary embodiments include, among others, the following.

The present disclosure provides a low-loss motor. The thrust structure of the motor is that the rear end of the rotating shaft is in direct contact with the rear cover. If the contact zone is made small, the power loss during operation of the rotating shaft will be reduced. A wear-resistant material is added to the rear cover to increase the life of the motor.

The present disclosure provides a drive circuit for the motor. In order to avoid the power output protection problem caused by the motor starting, this solution uses PWM to control the motor to perform a soft start to prevent the motor starting current from being too large. In addition, during the operation of the product, the power of the product is adjusted from time to time, and the power of the product is increased on the premise that the power of the product is not greater than the power of the power supply.

The present disclosure provides a drive circuit for a motor. The motor requires a large amount of energy when the motor is in the blow-off zone. As the USB power supply is insufficiently loaded, the duty cycle of the control PWM signal is reduced, so that the USB power supply is in the maximum output power maintenance stage, the motor speed is reduced and the pumping is the fastest: when the motor is in the blowing pressure zone, the motor work is reduced, the flow rate is reduced, and the load capacity of the USB power supply is sufficient, so the duty cycle of the control PWM signal is increased, and the motor speed is increased, the blowing pressure is increased.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The foregoing aspects and many of the intended advantages of this disclosure will become more readily appreciated as the same becomes better understood by reference to the following detailed description when taken in conjunction with the accompanying drawings.

Figure 1:
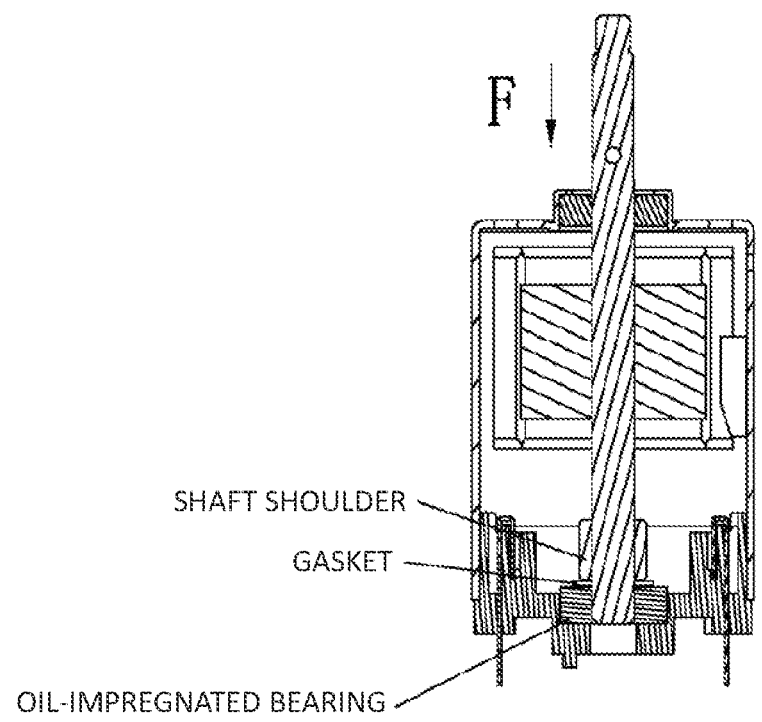
FIG. 1 illustrates a schematic diagram of a thrust structure of an existing motor.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION OF THE EMBODIMENTS

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

In the description, it should be noted that the terms upper, lower, inner, outer, top/bottom, etc. indicating the orientation or positional relationship based on the orientation shown in the drawings are only for the convenience of simplifying the description, rather than indicating or implying that the pointed device or element must have a specific orientation, be constructed and operated in a specific orientation, and therefore cannot be understood as a limitation of the present disclosure. In addition, the terms first and second are only used for descriptive purposes, and cannot be understood as indicating or implying relative importance.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

It should be noted that, unless otherwise expressly specified and limited, the terms installation, provided with, sleeve/connection, connection, etc., should be understood in a broad sense, for example connection can be a wall-mounted connection, a detachable connection, or an integral connection, a mechanical connection, an electrical connection, a direct connection, or an indirect connection through an intermediate medium, and can be an internal communication for two components.

Embodiment 1

Figure 2:
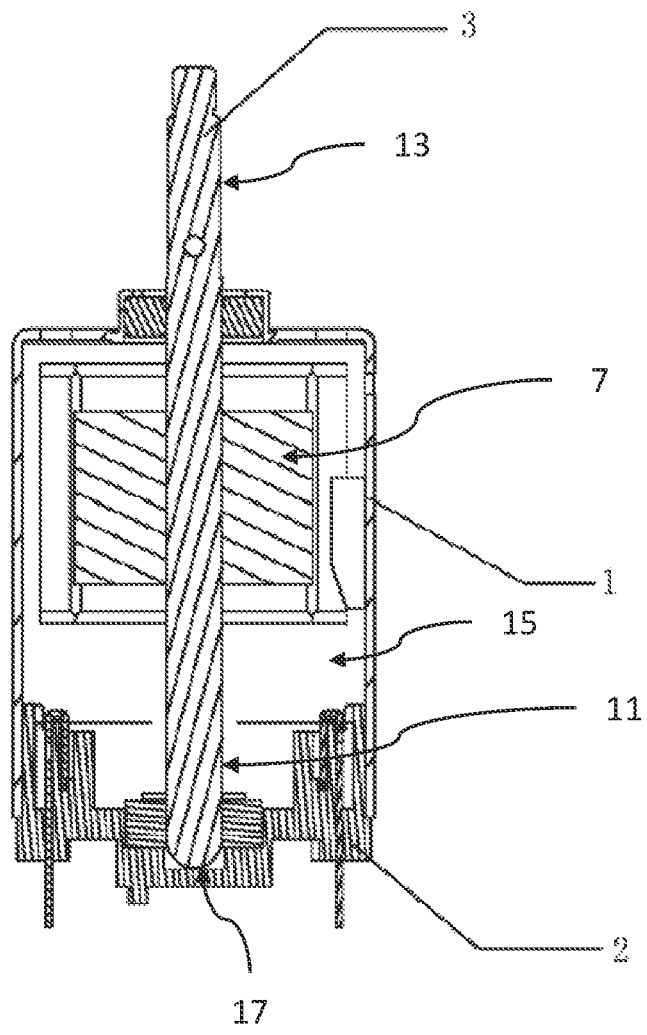
FIG. 2 illustrates a schematic diagram of a thrust structure of an exemplary motor of the present disclosure.

Referring to FIG. 2, a low-loss motor comprises a casing 1, a rear cover 2 and a rotating shaft 3. The rotating shaft 3 includes a first end 11 and a second end 13. The rear cover 2 is disposed at the rear end of the casing 1 along the axial direction of the casing 1. The casing 1 and the rear cover 2 cooperating to form an interior 15 of the motor. The first end 11 of the rotating shaft 3 is inserted into the casing 1 into the interior 15. The end face 17 of the first end 11 of the rotating shaft 3 inserted into the casing 1 is in direct contact with the rear cover 2. The end face 17 of the rotating shaft 3 is an arc surface. In the illustrated embodiment, the end face has a generally semi-hemispherical surface. In this way, the contact zone between the rotating shaft 3 and the rear cover 2 may be made smaller and the power loss when the rotating shaft 3 is running can be reduced. A wear-resistant material may be added to the rear cover 2 to increase the life of the motor.

The rotating shaft 3 supports a stator 7 of the motor. When current is supplied to the motor, the rotating shaft 3 rotates. In embodiments, the second end 13 of the rotating shaft 3 extends beyond the casing 1 and supports an impeller 102 (see FIG. 10). In embodiments, the impeller 102 directs airflow to either inflate or deflate an inflatable product 104.

Figure 5:
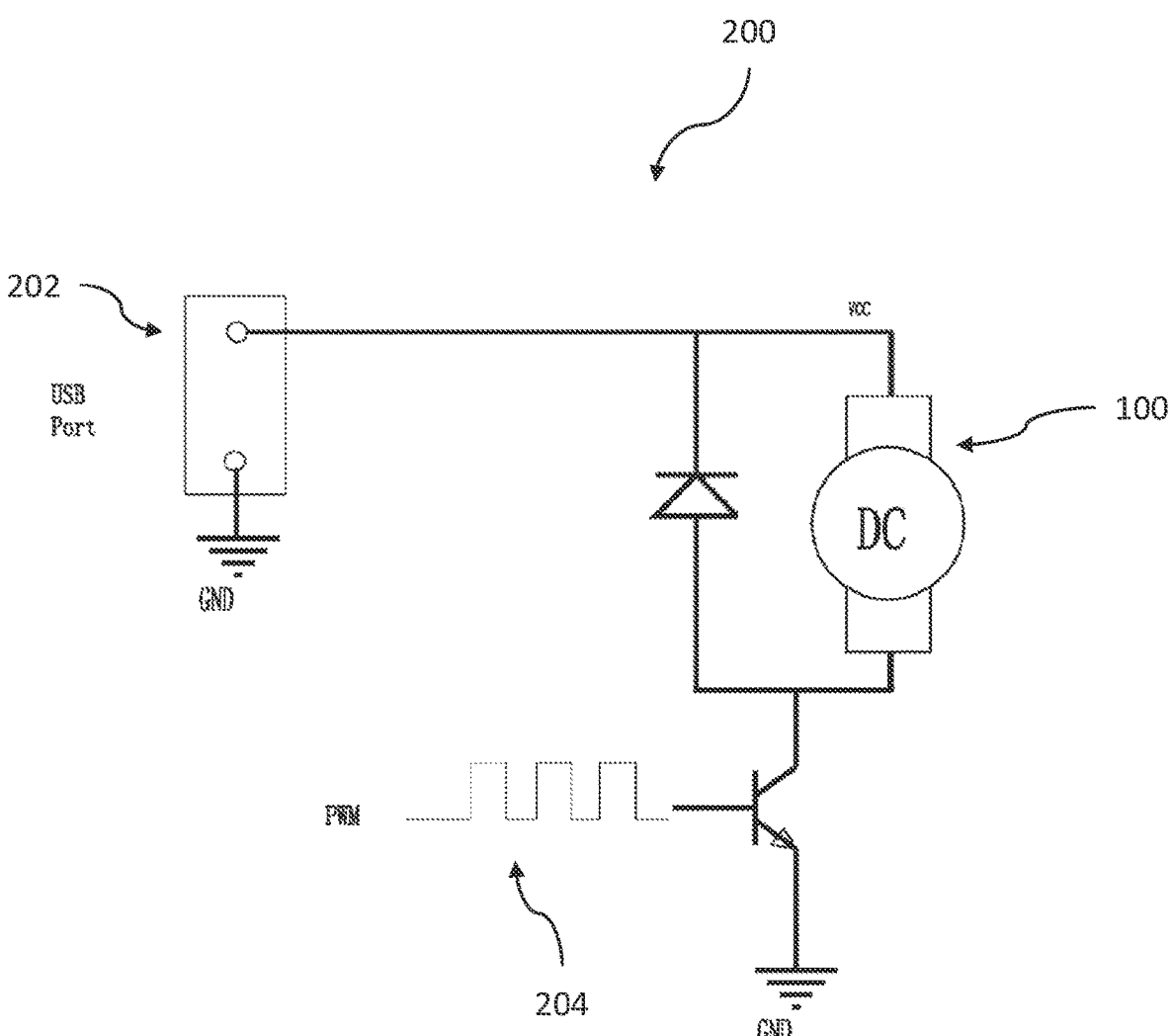
FIG. 5 illustrates a diagram of an exemplary drive circuit of the motor of FIG. 2.

Referring to FIG. 5, a drive circuit 200 for the motor 100 of FIG. 2 is shown. The drive circuit 200 is connected to a USB power supply 202, and uses a pulse width modulated (PWM) signal 204 to control the motor 100 to perform a soft start. The duty cycle of the PWM signal may be adjusted to make the power supply current of the motor in the starting zone slowly increase to the maximum supply current.

Figure 3:
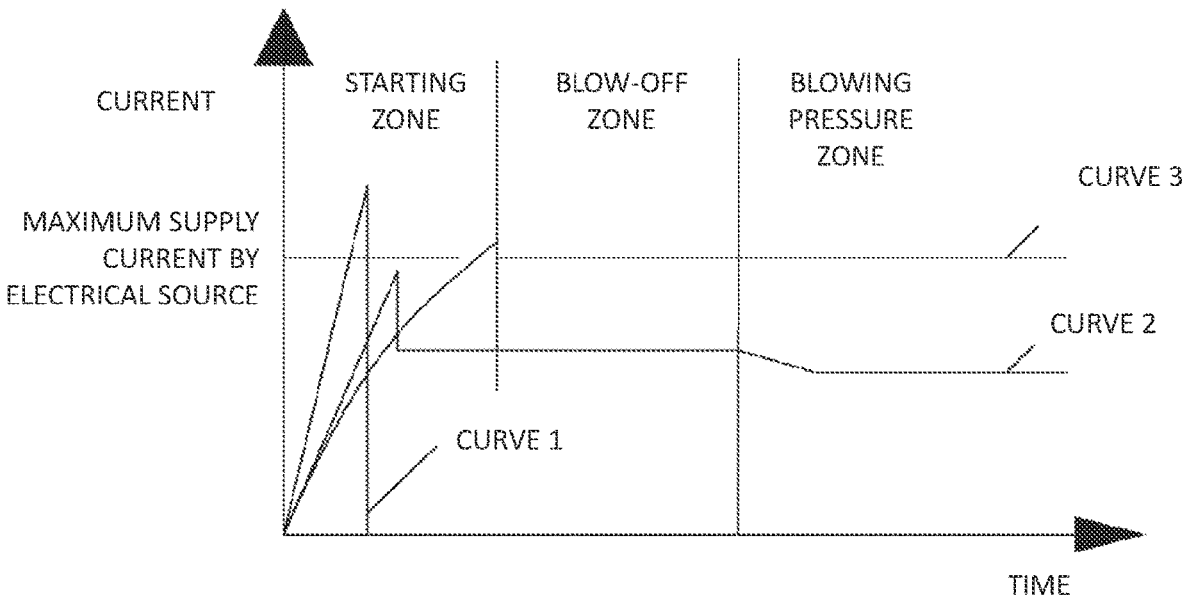
FIG. 3 illustrates a graph of the power supply current of the motor of FIG. 2.
Figure 4:
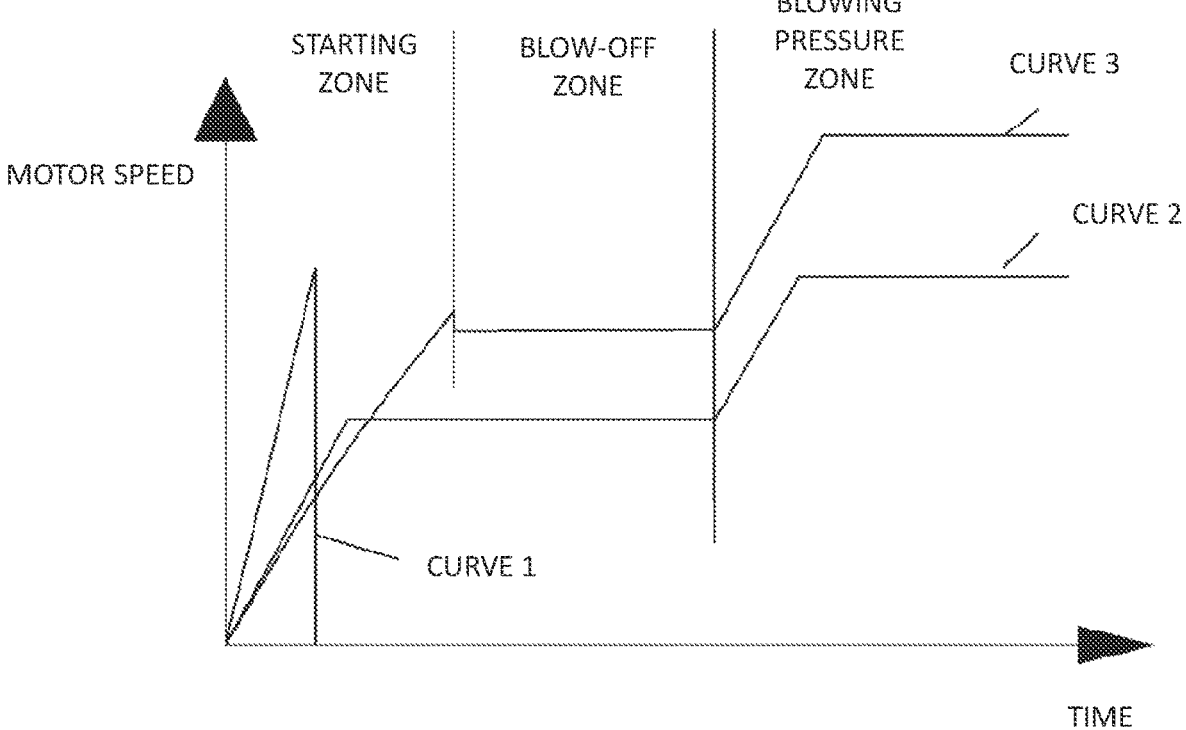
FIG. 4 illustrates a graph of the output rotating speed of the motor of FIG. 2.

As shown in FIG. 3 and FIG. 4, curve 1 is an ordinary high-current motor. If the starting current of the motor is greater than the rated current of the power supply, the power supply will cut off the output and the product will not work.

As shown in curve 2: in order to ensure that the power supply will not be cut off when the motor starts, the starting current of the motor can only be lower than the rated current of the power supply, so when the product is working, its operating current will be much lower than the rated current of the power supply, and the product function cannot be maximized. Due to the centrifugal air pump characteristics, when the air pump, impeller 102, mainly outputs flow, the power required is greater than that when the air pump mainly outputs blowing pressure, so the power of the product when the output air pressure is smaller than the rated current of the product (for example: the rated power of the power supply is 4A, the rated power of the product is 2A, the output blowing pressure power of the product is 1A)

As shown in curve 3: In order to avoid the power output protection problem caused by motor startup of curve 2, drive circuit 200 uses PWM signal 204 to control the motor 100 to perform a soft start to prevent the motor starting current from being too large. In addition, during the operation of the product, the power of the product is adjusted from time to time, and the power of the product is increased on the premise that the power of the product is not greater than the power of the power supply. (For example: the rated power of the power supply is 4A, the rated power of the product is 3.9A, and the output blowing pressure power of the product is 3.9A)

In addition, the motor requires a large amount of energy when the motor is in the blow-off zone (see FIGS. 3 and 4). As the USB power supply 202 is insufficiently loaded, the duty cycle of the control PWM signal 204 is reduced, so that the USB power supply is in the maximum output power maintenance stage, the motor speed is reduced and the pumping is the fastest: when the motor is in the blowing pressure zone, the motor work is reduced, the flow rate is reduced, and the load capacity of the USB power supply 202 is sufficient, so the duty cycle of the control PWM signal 204 is increased, and the motor speed is increased, the blowing pressure is increased.

In this embodiment, the motor is a brushed motor, and the specific circuit of the driving circuit 200 is shown in FIG. 5.

Embodiment 2

Figure 6:
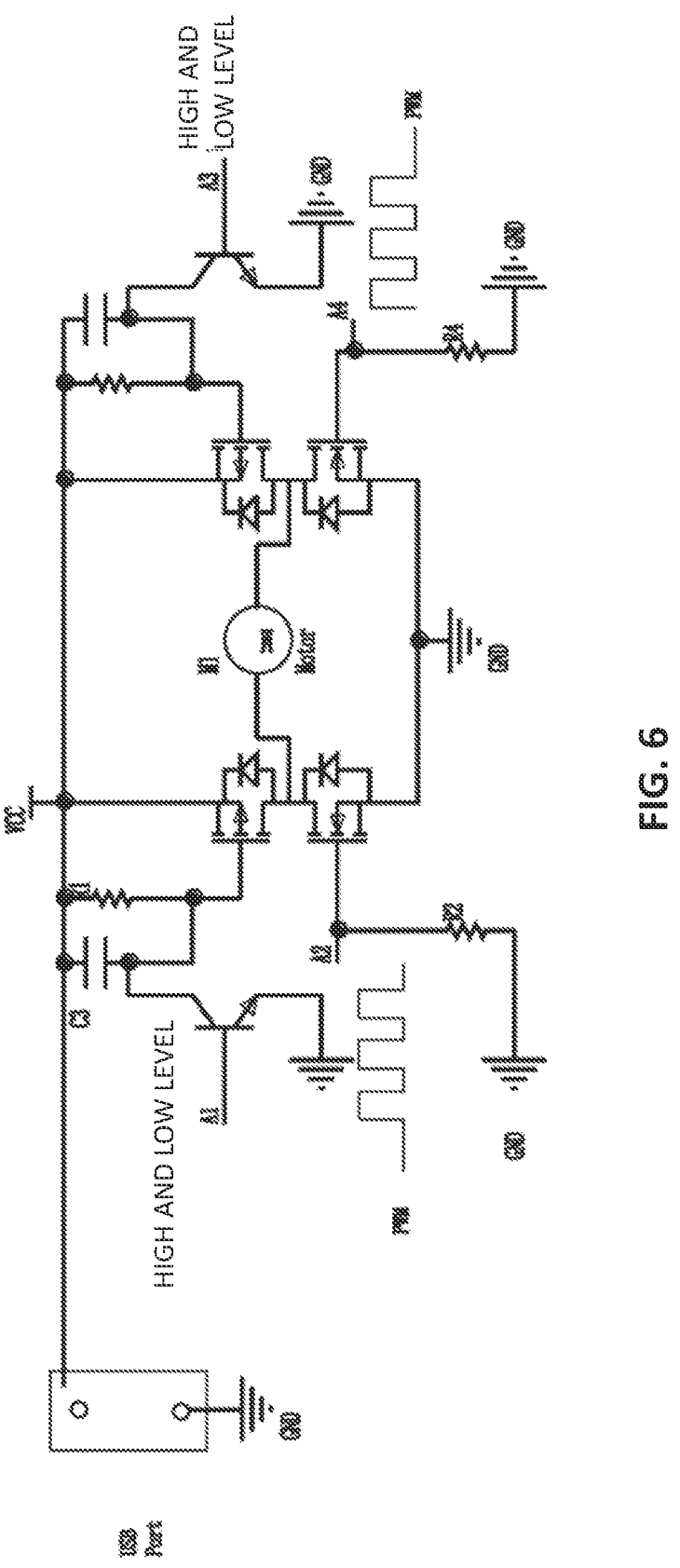
FIG. 6 illustrates a diagram of another exemplary drive circuit of the present disclosure.

The difference between this embodiment and Embodiment 1 is that the motor is a brushless motor, and the driving circuit 300 is shown in FIG. 6.

Embodiment 3

Figure 7:
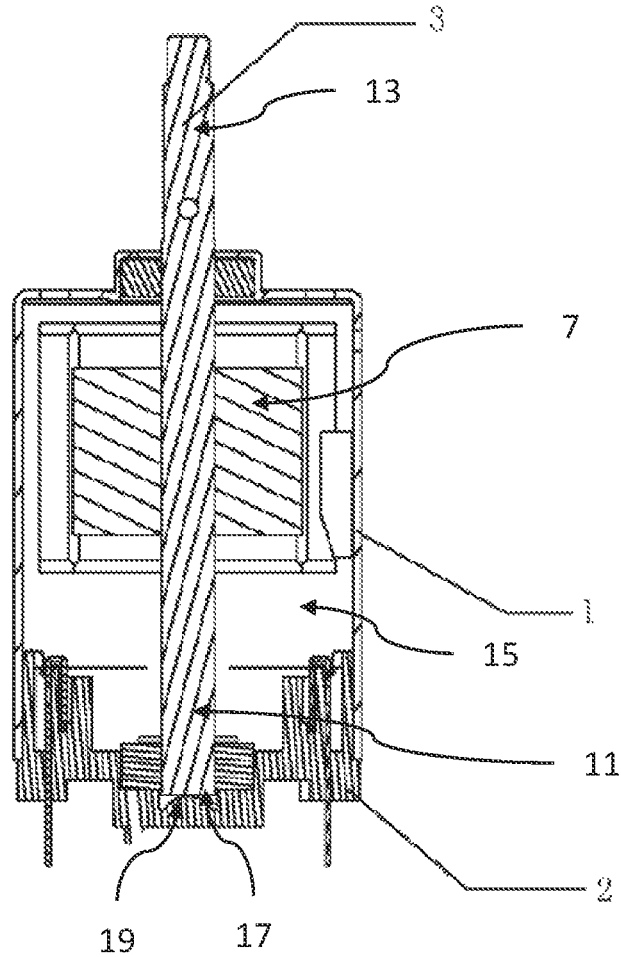
FIG. 7 illustrates a schematic diagram of the thrust structure of another exemplary motor of the present disclosure.

Referring to FIG. 7, the difference between this embodiment and Embodiment 1 is that the contact surface 19 of the rear cover 2 between the rear cover 2 and the rear end surface of the rotating shaft 3 is an arc surface. In the illustrated embodiment, the end face 17 of first end 11 of rotating shaft 3 is a planar surface. In embodiments, the end face 17 of first end 11 of rotating shaft 3 may also be an arc surface.

Embodiment 4

Figure 8:
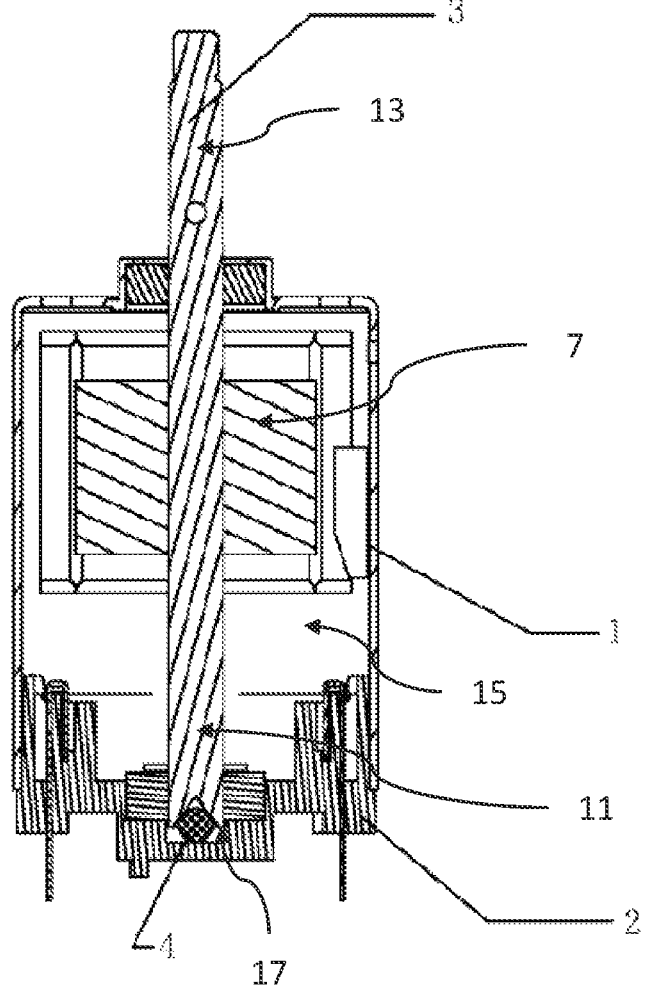
FIG. 8 illustrates a schematic diagram of the thrust structure of still another exemplary motor of the present disclosure.

Referring to FIG. 8, in this embodiment, the end face 17 of the first end 11 of the rotating shaft 3 is in contact with the rear cover 2 through a ball 4. In the illustrated embodiment, the end face 17 of first end 11 of rotating shaft 3 is a conical surface. In embodiments, the end face 17 of first end 11 of rotating shaft 3 may also be an arc surface, such as to match the shape of the ball 4. The contact surface 19 of the rear cover 2, in the illustrated embodiment, is a planar surface. In embodiments, contact surface 19 of rear cover 2 may be a conical surface or an arc surface.

Embodiment 5

Figure 9:
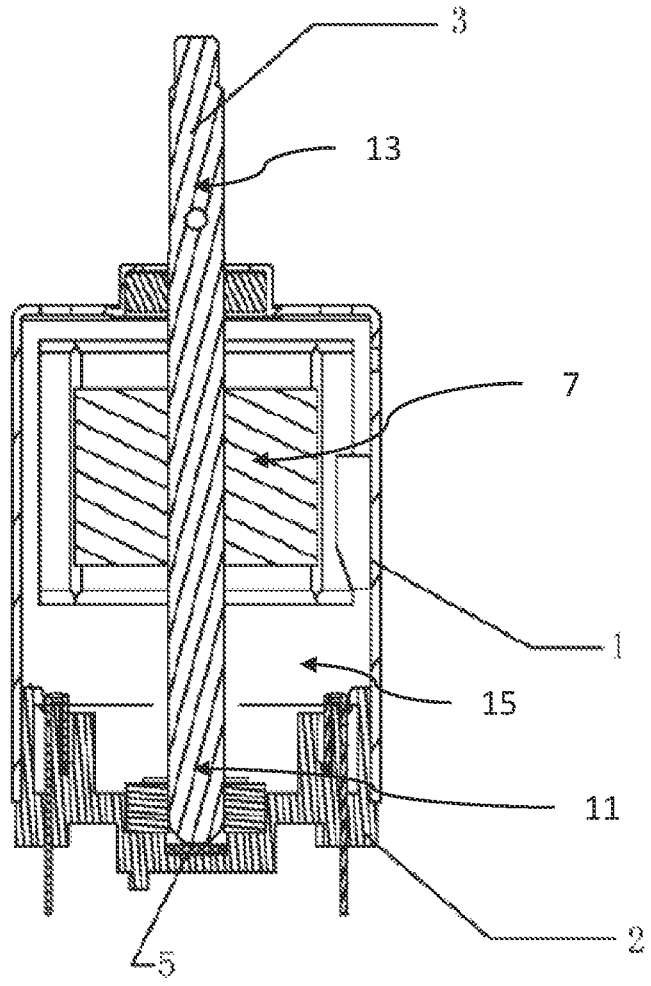
FIG. 9 illustrates a schematic diagram of the thrust structure of yet another exemplary motor of the present disclosure.

Referring to FIG. 9, the end face 17 of first end 11 of the rotating shaft 3 is in direct contact with the rear cover 2 through a wear-resistant gasket 5 and the end face of the rotating shaft 3 is an arc surface.

Embodiment 6

Figure 10:
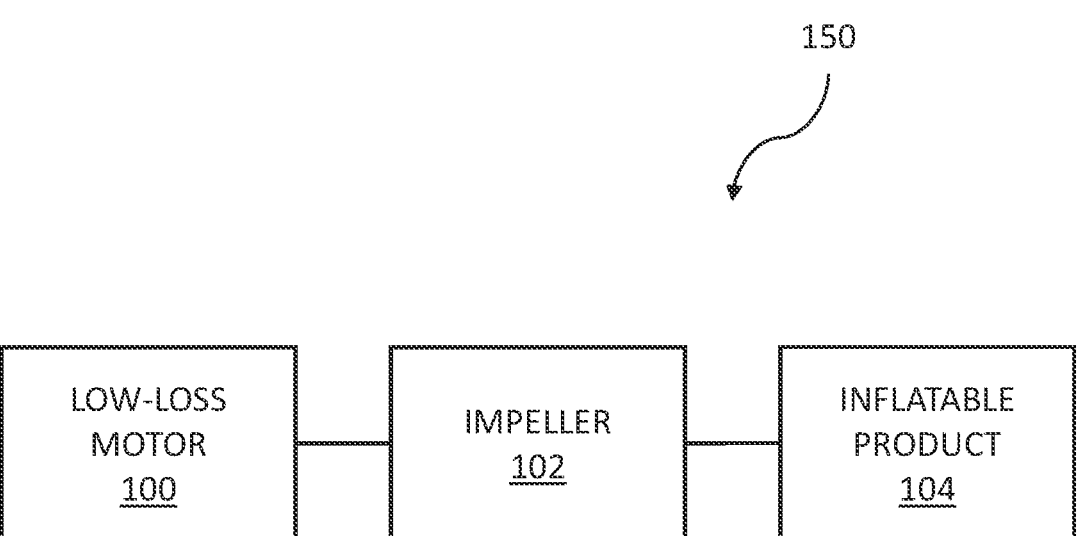
FIG. 10 illustrates an exemplary air pump of the present disclosure.

Referring to FIG. 10, an air pump 150 includes a low loss motor 100 according to one of the previous embodiments. The low loss motor rotates an impeller 102 which either blows air into an interior of an inflatable product 104 to inflate the inflatable product, pulls air from the interior of the inflatable product 104 to deflate the inflatable product, or both. Exemplary inflatable products 104 include air mattresses, pools, and other suitable inflatables.

EXAMPLES

Example 1: A low-loss motor may comprise a casing; a rear cover arranged at a rear end of the casing along an axial direction, the casing and rear cover cooperating to form an interior; and a rotating shaft having a first end and a second end opposite the first end. The first end of the rotating shaft may be inserted into the casing. An end face of the first end of the rotating shaft may be in direct contact with the rear cover. At least one of the end face of the rotating shaft and a contact surface of the rear cover contacting the rotating shaft may be an arc surface.

Example 2: A low-loss motor may comprise a casing; a rear cover arranged at a rear end of the casing along the axial direction; and a rotating shaft having a first end and a second end opposite the first end. The first end of the rotating shaft may be inserted into the casing. An end face of the first end of the rotating shaft may be contacted with the rear cover by a ball.

Example 3: A low-loss motor may comprise a casing: a rear cover arranged at a rear end of the casing along the axial direction: and a rotating shaft having a first end and a second end opposite the first end. The first end of the rotating shaft may be inserted into the casing. An end face of the first end of the rotating shaft may be in direct contact with the rear cover through a wear-resistant gasket. The end face of the first end of the rotating shaft may be an arc surface.

Example 4: A drive circuit of the low-loss motor according to any one of Examples 1 to 3 may be provided. The drive circuit may be connected to a USB power supply. The drive circuit may use a PWM signal to control the motor to perform a soft start. The drive circuit may adjust the duty cycle of the PWM signal to make the supply current of the motor in the starting zone slowly increase to the maximum supply current.

Example 5: The drive circuit according to Example 4, wherein a duty ratio of the PWM signal may be reduced when the motor is in a blow-off zone, so as to reduce the rotational speed of the motor.

Example 6: The drive circuit according to Example 4, wherein a duty ratio of the PWM signal may be increased when the motor is in a blowing pressure zone, so as to increase the speed of the motor.

Example 7: The drive circuit according to Example 4, wherein the motor may be one of a brushed motor or a brushless motor.

Example 8: A low-loss motor may comprise a casing: a rear cover arranged at a rear end of the casing along an axial direction: and a rotating shaft with a first end being inserted into the casing. An end face of the first end of the rotating shaft may be in direct contact with a contact surface of the rear cover. The end face of the first end of the rotating shaft may have a first shape and the contact surface of the rear cover may have a second shape different from the first shape.

Example 9: The low-loss motor of Example 8, wherein one of the first shape and the second shape may be an arc surface.

Example 10: The low-loss motor of Example 8, wherein one of the first shape and the second shape may be conical.

Example 11: The low-loss motor of Example 8, wherein one of the first shape and the second shape may be planar.

Example 12: The low-loss motor of any one of Examples 8-11, wherein the contact surface of the rear cover includes a wear-resistant material.

Example 13: A method of controlling an air pump is provided. The method comprising the steps of: supporting a first end of a rotating shaft of a motor of the air pump with a rear cover of the motor, an end face of the first end of the rotating shaft having a first shape and a contact surface of the rear cover having a second shape different from the first shape; supporting an impeller of the air pump with a second end of the rotating shaft; connecting a USB power supply to a drive circuit of a motor of the air pump; and controlling a current supplied by the drive circuit from the USB power supply to the motor with a PWM signal such that the current is below a first threshold during a start-up of the motor.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A low-loss motor, comprising:
   a casing;
   a rear cover arranged at a rear end of the casing along an axial direction, the casing and rear cover cooperating to form an interior;
   a rotating shaft having a first end and a second end opposite the first end, the first end of the rotating shaft is inserted into the casing, and an end face of the first end of the rotating shaft is in direct contact with the rear cover, wherein at least one of the end face of the rotating shaft and a contact surface of the rear cover contacting the rotating shaft is an arc surface, and
   a drive circuit connected to the low-loss motor and to a USB power supply and the drive circuit uses a PWM signal to control the motor to perform a soft start, the drive circuit adjusts the duty cycle of the PWM signal to increase the supply current of the motor to a maximum supply current during the soft start, the drive circuit reduces a duty ratio of the PWM signal when the motor is in a first operating zone to reduce a rotational speed of the motor, and the drive circuit increases the duty ratio of the PWM signal when the motor is in a second operating zone to increase the rotational speed of the motor.

2. A low-loss motor, comprising:
   a casing;
   a rear cover arranged at a rear end of the casing along the axial direction;
   a rotating shaft having a first end and a second end opposite the first end, wherein the first end of the rotating shaft is inserted into the casing, and an end face of the first end of the rotating shaft is contacted with the rear cover by a ball, and
   a drive circuit connected to the low-loss motor and to a USB power supply and the drive circuit uses a PWM signal to control the motor to perform a soft start, the drive circuit adjusts the duty cycle of the PWM signal to increase the supply current of the motor to a maximum supply current during the soft start, the drive circuit reduces a duty ratio of the PWM signal when the motor is in a first operating zone to reduce a rotational speed of the motor, and the drive circuit increases the duty ratio of the PWM signal when the motor is in a second operating zone to increase the rotational speed of the motor.

3. A low-loss motor, comprising:

a casing;

a rear cover arranged at a rear end of the casing along the axial direction; and a rotating shaft having a first end and a second end opposite the first end, wherein the first end of the rotating shaft is inserted into the casing, and an end face of the first end of the rotating shaft is in direct contact with the rear cover through a wear-resistant gasket and the end face of the first end of the rotating shaft is an arc surface, and a drive circuit connected to the low-loss motor and to a USB power supply and the drive circuit uses a PWM signal to control the motor to perform a soft start, the drive circuit adjusts the duty cycle of the PWM signal to increase the supply current of the motor to a maximum supply current during the soft start, the drive circuit reduces a duty ratio of the PWM signal when the motor is in a first operating zone to reduce a rotational speed of the motor, and the drive circuit increases the duty ratio of the PWM signal when the motor is in a second operating zone to increase the rotational speed of the motor.

4. The drive circuit according to claim 1, wherein a duty ratio of the PWM signal is reduced when the motor is in a blow-off zone, so as to reduce the rotational speed of the motor.

5. The drive circuit according to claim 1, wherein the second operating zone is a blowing pressure zone.

6. The drive circuit according to claim 1, wherein the motor is one of a brushed motor or a brushless motor.

7. A low-loss motor, comprising:

a casing;

a rear cover arranged at a rear end of the casing along an axial direction;

a rotating shaft with a first end being inserted into the casing, wherein an end face of the first end of the rotating shaft is in direct contact with a contact surface of the rear cover, the end face of the first end of the rotating shaft having a first shape and the contact surface of the rear cover having a second shape different from the first shape, and a drive circuit connected to the low-loss motor and to a USB power supply and the drive circuit uses a PWM signal to control the motor to perform a soft start, the drive circuit adjusts the duty cycle of the PWM signal to increase the supply current of the motor to a maximum supply current during the soft start, the drive circuit reduces a duty ratio of the PWM signal when the motor is in a first operating zone to reduce a rotational speed of the motor, and the drive circuit increases the duty ratio of the PWM signal when the motor is in a second operating zone to increase the rotational speed of the motor.

8. The low-loss motor of claim 7, wherein one of the first shape and the second shape is an arc surface.

9. The low-loss motor of claim 7, wherein one of the first shape and the second shape is conical.

10. The low-loss motor of claim 7, wherein one of the first shape and the second shape is planar.

11. The low loss motor of claim 7, wherein the contact surface of the rear cover includes a wear-resistant material.

12. A method of controlling an air pump, the method comprising the steps of:

supporting a first end of a rotating shaft of a motor of the air pump with a rear cover of the motor, an end face of the first end of the rotating shaft having a first shape and a contact surface of the rear cover having a second shape different from the first shape; supporting an impeller of the air pump with a second end of the rotating shaft; connecting a USB power supply to a drive circuit of a motor of the air pump;

controlling a current supplied by the drive circuit from the USB power supply to the motor with a PWM signal such that the current is below a first threshold during a start-up of the motor;

reducing a duty ratio of the PWM signal when the motor is in a first operating zone to reduce a rotational speed of the motor; and increasing the duty ratio of the PWM signal when the motor is in a second operating zone to increase the rotational speed of the motor.

13. The drive circuit according to claim 2, wherein a duty ratio of the PWM signal is reduced when the motor is in a blow-off zone, so as to reduce the rotational speed of the motor.

14. The drive circuit according to claim 2, wherein the second operating zone is a blowing pressure zone.

15. The drive circuit according to claim 2, wherein the motor is one of a brushed motor or a brushless motor.

16. The drive circuit according to claim 3, wherein a duty ratio of the PWM signal is reduced when the motor is in a blow-off zone, so as to reduce the rotational speed of the motor.

17. The drive circuit according to claim 3, wherein the second operating zone is a blowing pressure zone.

18. The drive circuit according to claim 3, wherein the motor is one of a brushed motor or a brushless motor.

* * * * *